United States Patent
Booth

(10) Patent No.: US 12,353,829 B2
(45) Date of Patent: Jul. 8, 2025

(54) DYNAMICALLY GENERATING DOCUMENTS USING NATURAL LANGUAGE PROCESSING AND DYNAMIC USER INTERFACE

(71) Applicant: Rowan TELS Corp., Seattle, WA (US)

(72) Inventor: Simon Booth, Washington, DC (US)

(73) Assignee: Rowan TELS Corp., Seattle, WA (US)

( * ) Notice: Subject to any disclaimer, the term of this patent is extended or adjusted under 35 U.S.C. 154(b) by 441 days.

(21) Appl. No.: 17/647,615

(22) Filed: Jan. 11, 2022

(65) Prior Publication Data

US 2022/0382983 A1 Dec. 1, 2022

Related U.S. Application Data

(60) Provisional application No. 63/193,981, filed on May 27, 2021.

(51) Int. Cl.
| | |
|---|---|
| G06F 40/289 | (2020.01) |
| G06F 40/14 | (2020.01) |
| G06F 40/166 | (2020.01) |
| G06F 40/284 | (2020.01) |
| G06F 40/40 | (2020.01) |

(52) U.S. Cl.
CPC ............ *G06F 40/289* (2020.01); *G06F 40/14* (2020.01); *G06F 40/166* (2020.01); *G06F 40/284* (2020.01); *G06F 40/40* (2020.01)

(58) Field of Classification Search
CPC .... G06F 40/289; G06F 40/284; G06F 40/166; G06F 40/40; G06F 40/14
See application file for complete search history.

(56) References Cited

U.S. PATENT DOCUMENTS

| | | | |
|---|---|---|---|
| 10,417,341 | B2 | 9/2019 | Schick et al. |
| 10,747,953 | B1 | 8/2020 | Priyadarshi |
| 2008/0178114 | A1 | 7/2008 | Milton |
| 2008/0313528 | A1 | 12/2008 | Chang |
| 2009/0210828 | A1 | 8/2009 | Kahn |

(Continued)

OTHER PUBLICATIONS

Lillemo, Shawn, "Become a Superhero—2019 IPO annual Meeting Patent Drafting Automation"; Harrity & Harrity; https://www.youtube.com/watch?v=egdRXS8iQeo.

(Continued)

*Primary Examiner* — Pierre Louis Desir
*Assistant Examiner* — Daniel W Chung
(74) *Attorney, Agent, or Firm* — Polsinelli PC

(57) ABSTRACT

Disclosed are systems, apparatuses, processes, and computer-readable media to convert apparatus and method claims into patent application disclosure. A process includes receiving a claim to be included in a patent application; separating the claim into a plurality of regions based on breakpoint; analyzing each region using a natural language processor; identifying at least one phrase within each region; determining a type of the at least one phrase, the type of phrasing including one of a functional phrase and an descriptive phrase; and creating text for the at least one phrase to be used in a complete sentence based on the type of the at least one phrase. The disclosed method can create content irrespective of statutory type of the claim and different methods and user interfaces to convert claims into descriptions.

19 Claims, 9 Drawing Sheets

(56) References Cited

U.S. PATENT DOCUMENTS

| | | | |
|---|---|---|---|
| 2013/0042170 A1* | 2/2013 | Milton, Jr. | G06Q 10/10 |
| | | | 715/225 |
| 2013/0198092 A1* | 8/2013 | Dugan | G06Q 99/00 |
| | | | 705/310 |
| 2013/0317994 A1 | 11/2013 | Tran | |
| 2017/0075877 A1 | 3/2017 | Lepeltier | |
| 2018/0173811 A1 | 6/2018 | Aragon y Willems | |
| 2018/0232361 A1 | 8/2018 | Schick | |
| 2018/0341630 A1* | 11/2018 | DeVries | G06F 40/14 |
| 2018/0365781 A1 | 12/2018 | Tsai | |
| 2019/0057074 A1 | 2/2019 | Carey | |
| 2019/0340217 A1* | 11/2019 | Tran | G06F 40/174 |
| 2020/0151393 A1* | 5/2020 | Schick | G06F 40/30 |
| 2021/0012444 A1 | 1/2021 | Carey | |
| 2023/0123328 A1* | 4/2023 | Gorman | G06F 40/289 |
| | | | 715/256 |

OTHER PUBLICATIONS

Parapatics, Peter and Michael Dittenbach. "Patent claims decomposition for improved information extraction." In Current Challenges in Patent Information Retrieval, pp. 197-216. Springer, Berlin, Heidelberg, 2011. (Year: 2011).

* cited by examiner a filter circuit on a path that connects the output terminal of the replica transistor to a base or a gate of the bias transistor via the current mirror circuit and the control path, the filter circuit being configured to attenuate a frequency component of a fundamental wave of the input signal and a frequency component of a modulated wave of the input signal, and wherein the base voltage or the gate voltage of the bias transistor is controlled in accordance with a current flowing in the control path.

FIG. 6A

1. A method comprising:
receiving a claim to be included in a patent application;
separating the claim into a plurality of regions based on a breakpoint;
analyzing each region using a natural language processor;
identifying at least one phrase within each region;
determining a type of the at least one phrase, the type of phrase including one of a functional phrase and a descriptive phrase; and
creating text for the at least one phrase to be used in a complete sentence based on the type of the at least one phrase.

FIG. 6B

4. The computing device of claim 1, further comprising a memory coupled to the bus ,~635
and configured to receive signals including data for storing in the memory based on ~640
power being supplied to the computing device.

5. The power amplifier circuit according to claim 2, wherein:
the current mirror circuit comprises a first transistor and a second transistor ,~645
a base or a gate of the first transistor being connected to a base or a gate of the second transistor , and the filter circuit is between the base or the gate of the first transistor and the base or the gate of the second transistor .

FIG. 6D

8. The power amplifier circuit according to claim 2, wherein the current mirror circuit further comprises:
a first transistor and a second transistor , a base or a gate of the first transistor being connected to a base or a gate of the second transistor, and a third transistor cascode-connected with the first transistor, and a fourth transistor cascode-connected with the second transistor .

- 702 — an amplifier transistor configured to amplify an input signal;
- 704 — a resistance element connected with the amplifier transistor;
- 706 — a bias transistor configured to supply a bias current from an emitter or a source of the bias transistor to the base of the amplifier transistor through the resistance element; and
- 708 — a feedback circuit configured to change a base voltage or a gate voltage of the bias transistor based on a change in the bias current,
- 710 — wherein the feedback circuit comprises:
  - 712 — a control path to which a reference current or a reference voltage is supplied,
  - 714 — a replica transistor configured to amplify a first current and to output a second current from an output terminal of the replica transistor, the first current being proportional to the bias current,
  - 716 — a current mirror circuit configured to generate a third current and to supply the third current to the control path, the third current being proportional to and less than the second current, and
  - 718 — a filter circuit on a path that connects the output terminal of the replica transistor to a base or a gate of the bias transistor via the current mirror circuit and the control path, the filter circuit being configured to attenuate a frequency component of a fundamental wave of the input signal and a frequency component of a modulated wave of the input signal, and wherein the base voltage or the gate voltage of the bias transistor is controlled in accordance with a current flowing in the control path.

FIG. 7

DYNAMICALLY GENERATING DOCUMENTS USING NATURAL LANGUAGE PROCESSING AND DYNAMIC USER INTERFACE

TECHNICAL FIELD

The present technology pertains to a method and apparatus for generating documents using natural language processing and a dynamic user interface.

BACKGROUND

Formal documents that are authored for administrative agencies are required to have a specific structure to comport with requirements of the administrative agency. The requirements include procedural-based rg6-equirements (e.g., margins, font size, etc.) and statutory-based requirements (content).

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 6A to 6E are various example claims that are analyzed based on the disclosed methods to illustrate identification of descriptive phrases, functional phrases, and linking phrases, in accordance with some examples;

FIG. 7 illustrates an example claim and a method of identifying subject-context relationships of a claim irrespective of statutory basis, in accordance with some examples;

DESCRIPTION

Figure 1:
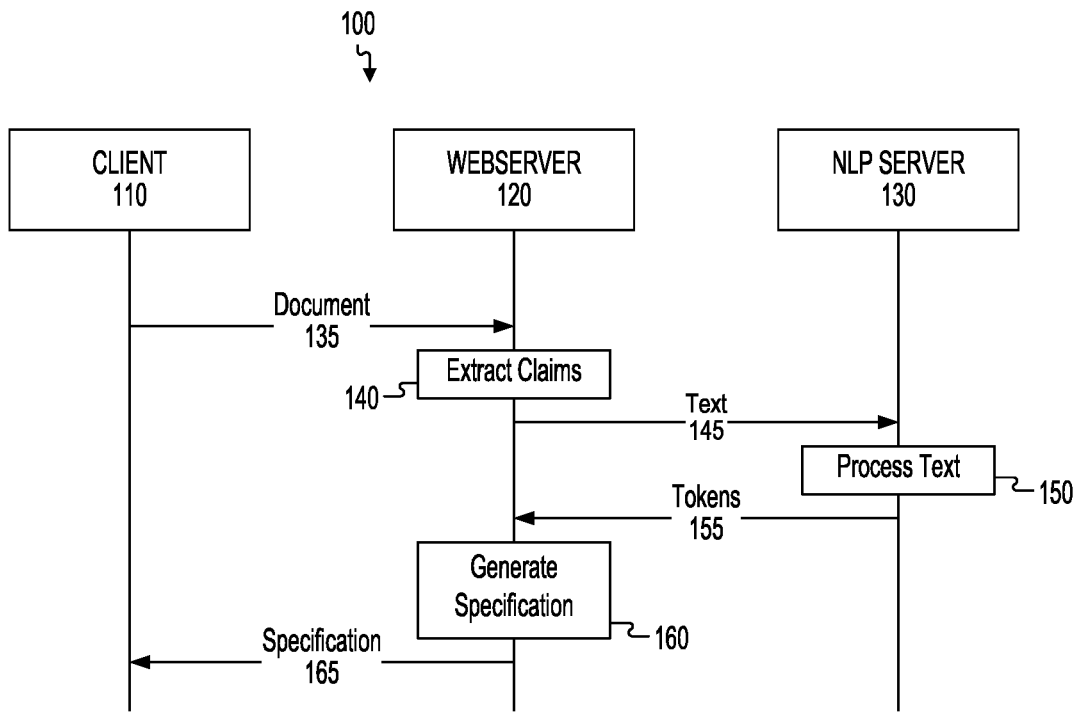
FIGS. 1 and 2 illustrate conventional systems for generating a patent specification.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As machine learning, especially natural language processing (NLP) become more robust it is tempting to look to these tools to perform certain tasks that are considered formulaic. While these tools are indeed beneficial, they are not suitable for producing completed work product in most instances. Machine learning tools are not yet able to take raw inputs, understand them, and write an explanatory document about those raw inputs. Therefore previous attempts at document creation using machine learning tools have focused on using structured inputs.

In the example tools used for drafting patent applications, a common structured input has been claims. Indeed those skilled in the art of drafting patent applications often begin with claims because they are the most important part of the document, and are designed to recite the novel aspects of an invention. However, such tools are limited to restructuring clauses of claims into sentences and pasting them into a document, which is insufficient to produce any useful work product. Further, existing tools only use method claims as inputs because method claims are predictable and structure can be inferred based on a gerund verb phrase (e.g., "transmitting a message") and identifying non-gerund phrases based on inferences and lack of gerund verbs. Other types of claims, such as apparatus or system claims, have a larger amount of variety and cannot be handled based on inferences.

In other examples, the existing tools only repeat the claims in the order they are input via the document and do not distinguish between the differences in the claims. In a patent application, a dependent claim could occur before the first limitation of an independent claim, could occur after the last limitation of the independent claim, or occur anywhere in between the first and last limitations. Moreover, a dependent claim may add subject matter or may further define previous actions. For example, a passive phrase in a dependent claim further defines subject matter to which it refers. Further, an active phrase may be defined by additional active phrases. The dependent claims may encompass multiple embodiments that are mutually exclusive (i.e., different species).

Existing tools may only generate a drawing based on the independent method claim, thereby producing an incomplete drawing. Further, the existing systems are also unable to identify condition-action sequences (e.g., if a condition is satisfied, perform a function) that would cause the flowchart to have branching logic because NLP itself is unable to disambiguate the meaning of phrases. The existing systems are also unable to represent inherent conditions, thus omitting content in the drawing that should be explicit.

The present technology improves over existing solutions by allowing input of any type of claim, whether apparatus, device, or system by distinguishing between descriptive phrases and functional phrases, irrespective of the root of the phrase. In some examples, a descriptive phrase describes an object (e.g., a processor connected to a memory), and a functional phrase describes a function of an object (e.g., a processor configured to process contents). The methods disclosed herein allow disambiguation of these different phrases types to allow each different phrase to be converted into a sentence. However, the descriptive phrases and functional phrases are different than previously disclosed verb phrases and adjective phrases because the prior phrase types (the verb phrase and the adjective phrase) use the root token as the premise of the type of phrase. The descriptive functional phrases and descriptive are different because the root token provides context, but both descriptive or functional phrases can include root tokens that are either a noun or a verb. For example, "a processor configured to process information" is a functional phrase even though the root token is a noun (the processor). By identifying functional and descriptive phrases, any type of claim can be disambiguated, such as claims related to a mechanical structure.

The present technology can perform functions previously that have been impossible, such as the conversion of apparatus into method claims. Conventional technology only converts method claims into apparatus claims by adding generic language (e.g., "a processor configured to") and changing conjugations of the gerund verbs (e.g., "processing the data" to "process the data") to yield an apparatus recitation (e.g., "a processor configured to process the data"). The present technology also allows additional inputs (e.g., drawings) that can be combined with the natural language processing to automatically generate descriptions of the input drawings.

By enabling the processing of apparatus claims, the present technology can be used to further automate tasks for application drafters and provide a usable draft of an application that discloses the claims, irrespective of the type of claim. Allowing different types of claim inputs allow patent drafting automation software to be extended from purely functional subject matter to concepts that include structure, and mix structure and function (e.g., electrical circuits, mechanical structures, electro-mechanical, etc.). In some aspects, the present technology can provide prompts to a user to provide disambiguation for terms, or to provide additional descriptive details. In this way, the present technology can encourage the user to provide additional input that may be beneficial to the NLP analysis.

A goal of the present technology is to provide the output that provides efficiency to an author, while leaving room for an author to provide the ingenuity and thoughtfulness that only a human author can provide. These and other improvements to tools that use algorithms or NLP to create documents are described herein.

Figure 2:
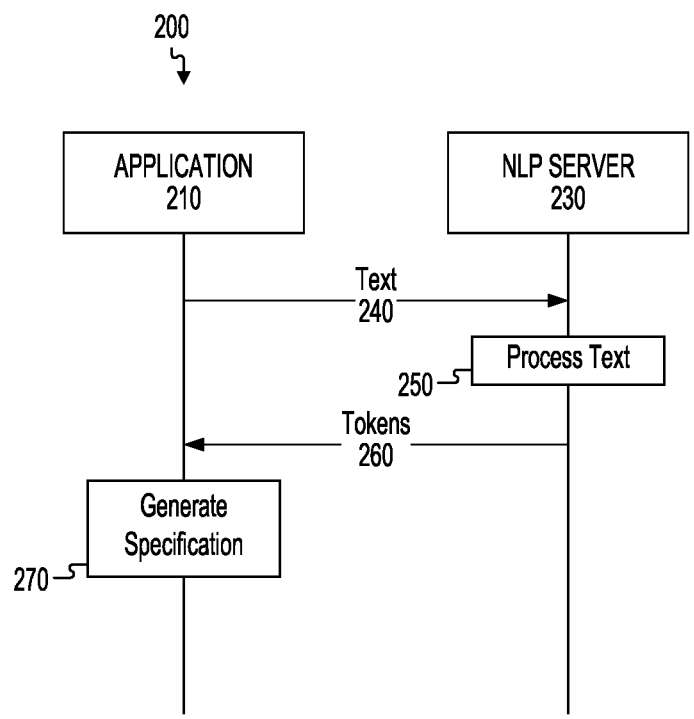

FIGS. 1 and 2 illustrate systems for generating patent applications. In particular, FIG. 1 illustrates a server-based process to generate the formal document, and FIG. 2 illustrates an application-based generation process to generate the patent specification. In general, each of these systems generally receives method claims as input and (1) converts the method claims into apparatus or device claims, (2) generates a description of a flowchart based on a set of method claims (i.e., a single independent claim and generally at least one dependent claim that depends from that single independent claim), and (3) creates a single generic flowchart diagram based on the independent claim. The systems may also be able to insert generic device descriptions and boilerplate based on a client's requirements.

Referring to FIG. 1, a system 100 comprises a client 110 that connects to a webserver 120 for generating the patent specification. In the system 100, the client 110 transmits a document at step 135 that includes a set of method claims to the webserver 120. Having received the document with method claims, the webserver 120 extracts the method claims from the document at step 140. After extracting the claim, the webserver 120 transmits text that corresponds to the method claims to a natural language processing (NLP) server at step 145.

The NLP server 130 receives the text and processes the text into NLP tokens at step 150. An NLP token (or token) is generally a single word or a single character (e.g., punctuation) and is assigned several properties. For instance, each NLP token is generally assigned an identifier (ID), a part of speech tag that identifies the part of speech (e.g., noun, verb, etc.), and a dependency label that identifies how the part of speech depends on other tokens, and so forth. In general, NLP engines also assign what is referred to as a fine part of speech, which further clarifies the purpose of that word. For example, a noun can be the object of the sentence, but could also be part of a compound noun (that is, a single object that has a name including several words), which is also referred to as an n-gram.

A dependency label identifies how the token depends on other tokens. For example, an NLP token may be a determiner (i.e., an article such as "the" or "an"), a nominal subject, a clausal subject, an adverbial clause, conjunction, punctuation, and so forth. A dependency label referred to as root corresponds to the root of the sentence or phrase and is not dependent on any other tokens in that sentence. For example, in the sentence "I love fries," the NLP token "love" is the root, "I" is the proper noun having a dependency of noun subject from the root, and "fries" is the noun that is a direct object of the root. For example, the output of this sentence is illustrated in Table 1 below.

TABLE 1

| Id | RootId | Text | Course Tag | Fine Tag | Dependency Label |
|---|---|---|---|---|---|
| 0 | 1 | I | Noun | Personal Pronoun | Nominal Subject |
| 1 | 1 | love | Verb | Non-$3^{rd}$ person present verb | Root |
| 2 | 1 | fries | Noun | Plural Noun | Direct Object |

The NLP server 130 transmits the tokens to the webserver 120 at step 155, which converts the tokens into a patent specification at step 160. The webserver 120 creates a flowchart and a corresponding description to that flowchart based on NLP tokens from the method claims. To create the description of the flowchart, the webserver 120 extracts the individual portions of tokens that can be converted into a single sentence based on the order in which they are identified in the method claim (i.e., text).

Specifically, the webserver 120 converts an active step, which is a clause having an active gerund as its root word, into a sentence using a different tense. For example, the webserver 120 may convert a phrase "performing a function" into "perform a function" and then add generic content such as "a processor may" to the beginning of the phrase, thus forming "a processor may perform a function." In this case, the generic structure is predetermined and not associated with user input. That is, the webserver 120 receives the method claims in a particular sequence and then generates a flowchart description based on the order of claims. After generating the specification, the webserver 120 transmits the patent specification with the flowchart description and additional boilerplate back to the client 110 at step 165. The webserver 120 may also transmit any created flowchart drawings or generic drawings at step 165.

FIG. 2 illustrates a system 200 that is similar to the system 100, but has a different architecture. In particular, the system 200 comprises an application 210, which may be executing on a client computer, which communicates with the NLP server 230.

The application 210 extracts the text of the method claims and transmits the text to the NLP server 230 at step 240. The NLP server 230 processes the text into NLP tokens at step 250 and returns the text as NLP tokens at step 260 to the application 210. In response to receiving the NLP tokens, the application 210 may generate the specification or part of the specification at step 270. The application 210 generates a flowchart based on the independent claim, generates a flowchart description based on the order of the claims, and composes apparatus or device claims from the method claims.

As noted above, the system 100 or system 200 may also compose additional claims from the method claims. In more detail, the system 100 or system 200 converts a method claim, which has gerund verbs, into a device or system claim, which has present tense verbs. However, in each case, the system 100 or system 200 will only provide generic structure (e.g., a processor, a memory, a display). The system 100 or system 200 may also generate "means" claims by changing the preamble and adding "means for" before the root gerund verb.

Figure 3:
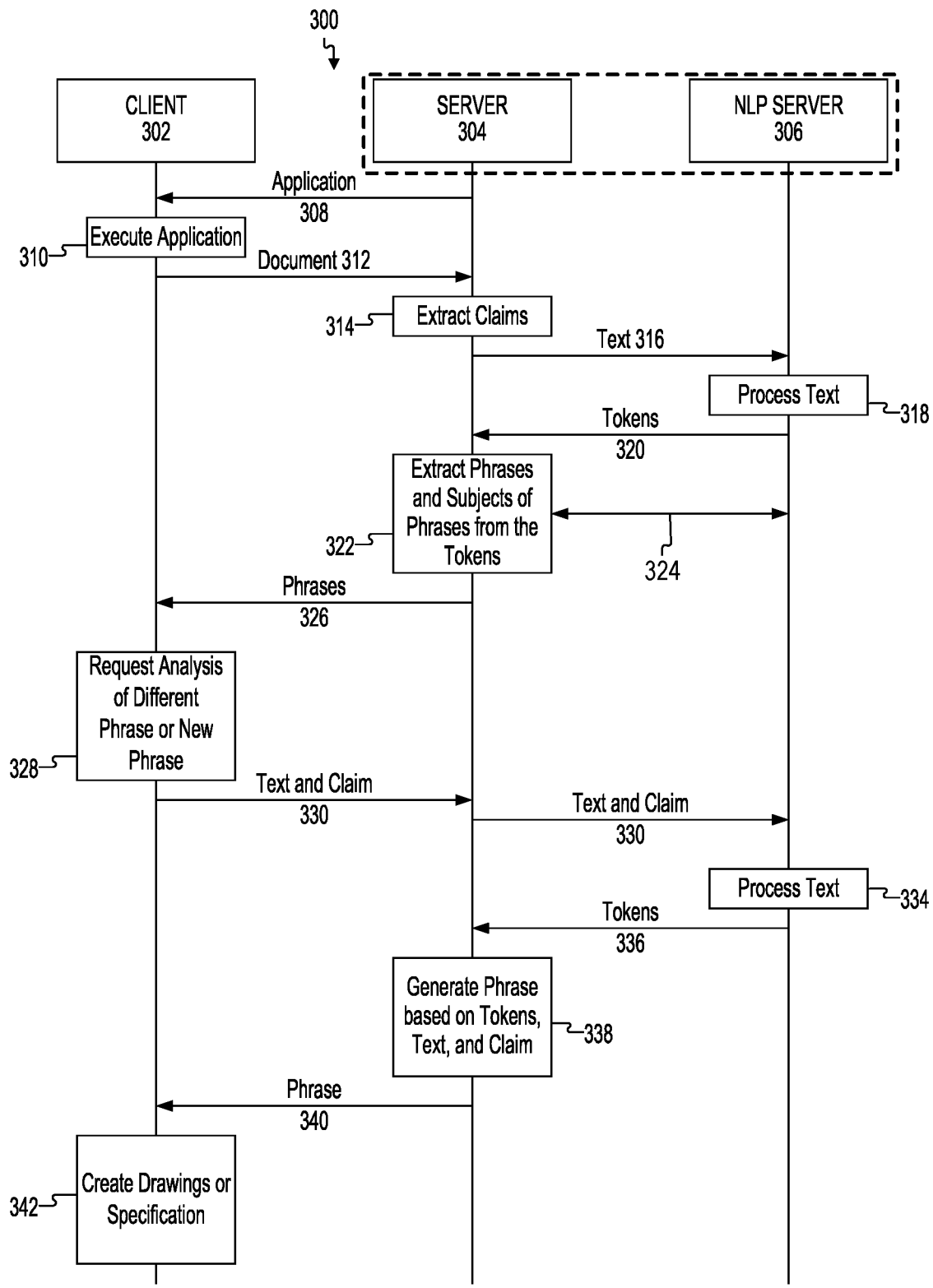
FIG. 3 illustrates a sequence diagram of an example system for dynamically generating documents using natural language processing (NLP), in accordance with some examples.
Figure 4:
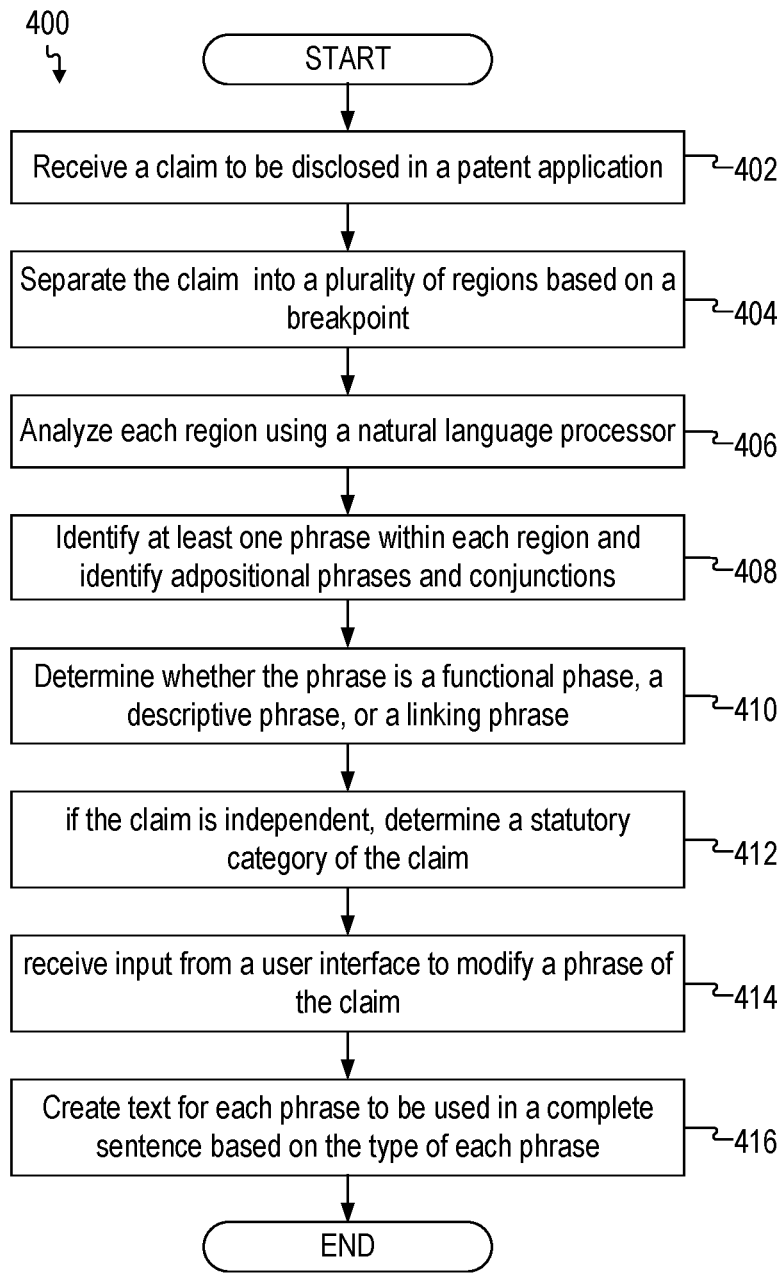
FIG. 4 illustrates an example method 400 for analyzing claims for generating descriptions for a patent application irrespective of statutory form, in accordance with some examples.
Figure 5:
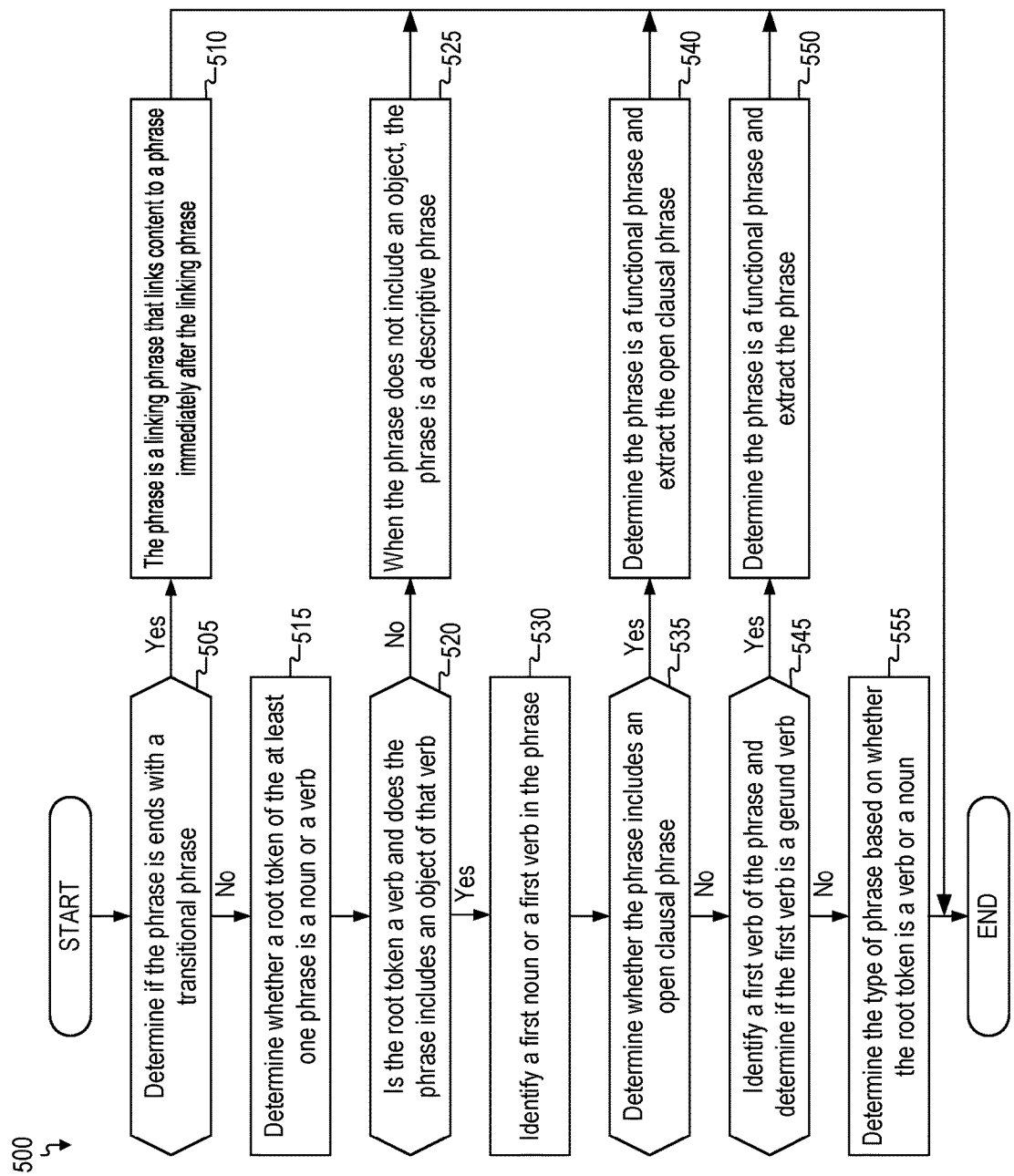
FIG. 5 illustrates an example method 500 for determining a type of a phrase that is extracted from a claim irrespective of the statutory basis for that claim, in accordance with some examples.
Figure 8:
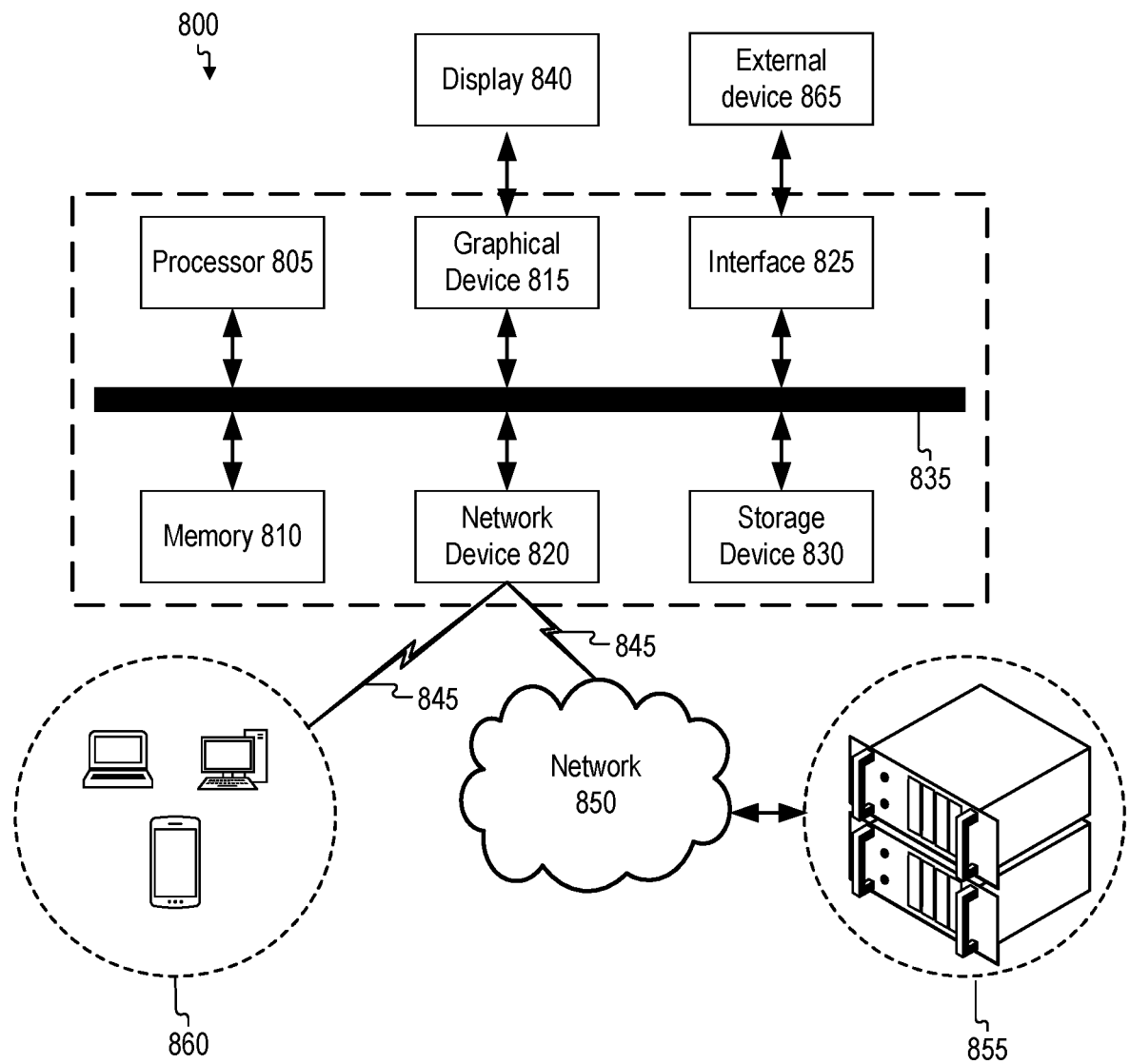
FIG. 8 illustrates an example computer system 800 for executing client or server operations, in accordance with some examples.
Figure 9:
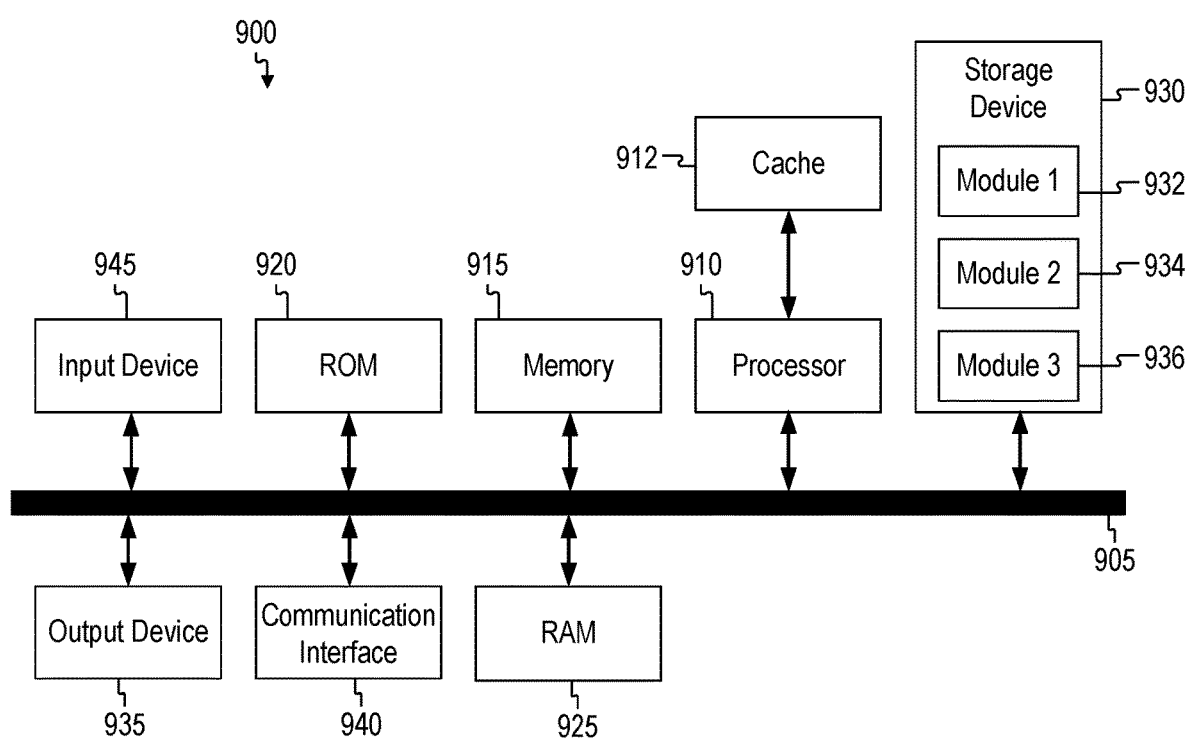
FIG. 9 illustrates an example of a computing system in accordance with some examples.

FIG. 3 illustrates a system to extract phrases of a claim irrespective of the statutory type (e.g., method, apparatus, etc.) of the claim. FIGS. 4 and 5 illustrate methods executed by an device of the system to extract phrases irrespective of the statutory type of the claim. FIGS. 6A to 6E illustrate various examples of claims and phrases identified from the claims by using the methods disclosed in FIGS. 4 and 5. FIG. 7 illustrates a method for identifying subject and context to assist in the sentence constructions. FIGS. 8 and 9 illustrate various systems that can implement the disclosed technology. The disclosure now turns to FIG. 3 to illustrate a system for creating standardized documents from a set of inputs.

FIG. 3 illustrates a sequence diagram of an example system 300 for dynamically generating standardized documents using NLP and a dynamic user interface. For example, the documents can be a document for submission to an administrative agency based on that administrative agency's procedural requirements. The disclosed system can be applied to any type of standardized document that has a structure that may benefit from visually organizing concepts to form complex relationships from input text.

In the context of a patent application, the system 300 provides an improved NLP analysis method to extract phrases of a claim irrespective of the statutory type (e.g., method, apparatus, etc.). The system 300 comprises a client 302, a server 304, and an NLP server 306. In some examples, the server 304 and NLP server 306 can be different server processes executing on the same hardware or configured virtual machine. If the NLP server 306 is hosted locally on the same server as the server 304, the NLP engine may be based on a local NLP engine such as natural language toolkit (NLTK), Stanford CoreNLP, etc. However, the NLP server 306 may also be a third-party server such as Google Natural Language, Microsoft Cognitive Services, or Amazon Comprehend.

As an example, a virtual machine can execute a webserver in a reverse proxy configuration, which parses the requested uniform resource identifier (URI) and directs the request to the server 304 or NLP server 306 based on the URI. For example, any URI beginning with "/nlp" (e.g., "/nlp/document", "/nlp/phrases", etc.) is forwarded to the NLP server executing on port 9000. Any other URI is forwarded to the server 304 executing on port 6000. In another example, the functionality provided by the server 304 may be performed based on an application executing on the client 302 (e.g., an Electron application, a React Native Desktop application, etc.) that includes local libraries and can directly access the file system of the client 302.

In this example, the client 302 receives an application from the server 304 at step 308. For example, the application may be a component object model (COM) plugin application that executes within another application (e.g., Microsoft Word®), a stand-alone application that natively executes as an application (e.g., a Windows® Presentation Foundation (WPF) application, etc.), or a hosted application that uses another application such as a web browser to render the user interface (e.g., React Native, React Native Desktop, Electron JS, Blazor WebWindow, .net MAUI, etc.). In some examples, the application can be a web application (e.g., a Microsoft 365® add-in) that is sideloaded into a local application (e.g., Microsoft Word) or a web application (e.g., Microsoft 365®) and uses an application programming interface (API) to perform functions.

The client 302 may execute the application at step 310. As noted above, the application may be executed within a browser's sandbox. However, the application may also be an add-in that executes within another application such as a React-based add-in that is executed within Microsoft Word® and can use various APIs to interact with the document and the application. In the example illustrated in FIG. 3, the system 300 is presumed to execute in a browser sandbox and any descriptions in FIG. 3 may be modified or changed based on the execution environment of the application.

At step 312, the application transmits the document including at least one claim to the server. As noted above, FIG. 3 may be modified based on the execution environment. As an example, if the application is a React add-in that is executing within Microsoft Word, at step 312 the application may, using an API available via the application (Office.js, etc.), retrieve the text corresponding to the claims and transmit the text to the NLP server 306.

After receiving the document, the server 304 extracts text from the claims at step 314 and transmits text from the claims at step 316 to the NLP server 306. For example, the claim generally is separated by line breaks and may include whitespace (e.g., spaces, tabs, line breaks, etc.) to illustrate relationships that matter in the claims. The margins, indents, and other paragraph properties can also be used to identify relationships in the claims. Accordingly, identification information of the claim is also extracted and transmitted to the NLP server at step 316. For example, the identification information may be the claim number and claim line encoded into a unique value, and the text may be transmitted as a key-value pair at step 316. The NLP server 306 processes the text into NLP tokens at step 318 and transmits the tokens and token identification information to the server at step 320. The NLP server 306 generates token identification information to indicate a position of the token in the input text and to identify token relationships based on the various token properties (e.g., dependency label, part of speech, etc.).

At step 322, the server 304 extracts phrases and subjects of the phrases from the tokens. In some instances, the phrases do not have a subject (e.g., the phrase is a gerund verb in a method claim and the subject is the preamble of the claim) or a subject for the sentence can be provided based on a context of the phrase. The phrases may be extracted based on the identification of grammar features that link complete phrases such as adpositional phrases (e.g., "after receiving the message", etc.) and conjunctions (e.g., "receiving, processing, and storing") that can be used to form a complete sentence. For example, an adpositional phrase cannot be used to create a sentence because it provides context to another phrase. In some examples, the server 304 may need to reprocess phrases outside of the context of the region at step 324 to identify the phrases. In some aspects, the server 304 may create a data structure for sending the phrases to the client 302 for efficient transmission. In particular, because the tokens have a large amount of data, the transmission of all tokens using JavaScript object notation (JSON) structures can consume significant bandwidth due to the number of properties that must be explicitly identified. An example data structure of a single paragraph in extensible markup language (XML) format is illustrated in Table 1 that can configure the various sentences using different types of spans that identify the different phrases of the paragraph. The paragraph in Table 1 is further illustrated in FIG. 6A.

TABLE 2

```
<p>
    <descriptiveSpan subject="filter circuit" context ="feedback circuit"
        sentencePreamble="The feedback circuit ">
        a filter circuit on a path that connects the output terminal of the
        replica transistor to a base or a gate of the bias transistor via the
        current mirror circuit and the control path
    </descriptiveSpan>
    <span>, </span>
    <functionalSpan subject="filter circuit" context ="feedback circuit"
        asPresent="the filter circuit attenuates a frequency component of
        a fundamental wave of the input signal and a frequency component
        of a modulated wave of the input signal" asPast="the first circuit
        attenuated a frequency component of a fundamental wave of the
        input signal and a frequency component of a modulated wave of
        the input signal">
        the filter circuit being configured to attenuate a frequency component
        of a fundamental wave of the input signal and a frequency compo-
nent
        of a modulated wave of the input signal
    </functionalSpan>
    <span>, and wherein </span>
    <descriptiveSpan subject="filter circuit" context ="feedback circuit"
        sentencePreamble="In some examples, ">
        the base voltage or the gate voltage of the bias transistor is
        controlled in accordance with a current flowing in the control path
    </descriptiveSpan>
    <span>.</span>
</p>
```

The phrases 326 from the claims are generated by the server and then sent to the client 302. In some aspects, the phrases can be configured at the client 302. For example, if the client 302 is a desktop application (.net MAUI, electron, React Native Desktop) that does not execute in a sandbox, the desktop application may perform these functions.

In some cases, the subject of the sentence is not the subject of the phrase because a context of the phrase, which can be determined based on whitespace, linebreaks, and other formatting, may impute a subject. To this end, a "context" may be detected from previous phrases and a "subject" may be identified in the current phrase. For example, a previous phrase could be a linking phrase such as "the feedback circuit includes:" which is followed by a whitespace or formatting to indicate that the following items (e.g., the filter circuit in Table 1) are integral to or part of the parent item (e.g., "the feedback circuit"). Based on the context and the subject, the phrase can be converted into a complete sentence.

The identification of different types of phrases is challenging and may not always be correct because the NLP may not handle some aspects of grammar and the meaning of some words. The NLP understands the relationship of the words, but cannot understand their meaning, and words may sometimes have multiple meanings and forms. For example, "scheduling" is a gerund verb, but "scheduling information" is a noun. To address this issue, the application may include a user interface to permit a user to request analysis of a phrase from the claims or a new phrase (e.g., a phrase not in the claims) at block 328. In some aspects, the user can select the text using a cursor and right-click to select a new analysis of the phrase based on a type determined by the user. For example, the contextual menu displays two options to analyze the highlighted text as a descriptive phrase or a functional phrase. In other examples, the user interface may display an option to input text and allow the user to analyze the new text based on additional input (e.g., a context, a subject).

Creating a new phrase independent of its context can lead to incorrect results because the subject of the phrase can have a context that may not be input. In some cases, the selected text and parts of the claim 330 can be identified and transmitted to the server 304, which forwards the selected text and parts of the claim 330 to the NLP server 306 for processing at block 334. The NLP server 304 returns tokens 336 to the server 304 and, at block 338, the server 304 generates a phrase 340 associated with the user request based on the tokens 336 and the selected text and parts of the claim 330. After the creation of the new or modified phrase, the user may perform input into the application to sequence a patent application together. For example, the user may use a flowchart user interface to sequence a method together and the application can create a specification based on that flowchart user interface.

In some aspects, the application may be configured to create drawings or a specification at block 342 based on the phrases and associated data (e.g., subject and context). In some aspects, the drawings or specification can be created at the client 302 using the application or the client 302 can request the server 304 to create the application.

In the example illustrated in FIG. 3, an improved NLP analysis method is described that allows the processing of both method and apparatus claims. By allowing input of method or apparatus claims and identification of structure (descriptive phrases) and functions (functional phrases), common types of claims can be converted into sentences. This allows applications to be developed to create patent specifications from apparatus claims, which has been impossible because of the large variety of variation in these claims types. In some cases, the understanding of the different types of phrases can also be used to train machine learning (ML) models to perform similar functions. In some cases, the disclosed methods and processes, which are further disclosed herein with reference to FIGS. 4 and 5, can be used for training an ML model. In some other cases, the disclosed methods and processes can be used to preprocess text for input into an ML model to identify the different phrase types. FIGS. 6A to 6E illustrate various results of processing different claims based on the disclosed methods and processes.

FIG. 4 illustrates an example method 400 for analyzing claims for generating descriptions for a patent application irrespective of the statutory type (e.g., method or apparatus claim). Although example method 400 depicts a particular sequence of operations, the sequence may be altered without departing from the scope of the present disclosure. For example, some of the operations depicted may be performed in parallel or in a different sequence that does not materially affect the function of method 400. In other examples, different components of an example device or system that implements the method 400 may perform functions at substantially the same time or in a specific sequence.

According to some examples, method 400 includes receiving a claim to be included in a patent application at block 402. For example, an application that is executing on a processor 805 illustrated in FIG. 8 may receive a claim to be included in a patent application.

According to some examples, method 400 includes separating (e.g., by the processor 805) the claim into a plurality of regions based on a breakpoint at block 404. The text can be in different forms such as a word document, a hypertext markup language (HTML) element, or text, and the text can be used to separate different regions and identify relationships using line breaks, paragraph elements (e.g., <w:p> elements in a word .docx file, etc.).

According to some examples, method 400 may analyze text associated with each region using a natural language processor at block 406. For example, the application may send the text to a natural language processor for analysis of each token in the text of that region. A token can be a word, punctuation, or a part of words (e.g., hyphenated words such as processor-based, etc.). In some examples, the regions correspond to a new line of the text, or a particular element (e.g., paragraph elements).

According to some examples, method 400 includes identifying (e.g., by the processor 805) at least one phrase within each region at block 408. For example, the processor 805, illustrated in FIG. 8 (or the processor 910), may identify at least one phrase within each region. The phrases can be identified based on, for example, identifying tokens in results of the natural language processor that are immaterial to creating sentences from the claim. For example, a claim includes a number of text items that are immaterial for creating language, such as a preamble of a dependent claim, or punctuation at the end of a line. In some cases, a "wherein" or a "whereby" clause can be deemed immaterial. After identifying immaterial tokens, method 400 separates the region into groups of words based on punctuation in the region. In some cases, punctuation can be part of a single phrase (e.g., a conjunction) or can separate phrases.

According to some examples, block 408 may further include analyzing each group of words using the natural language processor. For example, each phrase can be analyzed to determine if the group of words includes information that would be sufficient to form an entire sentence from. Based on the analysis of each group of words, block 408 can determine whether to merge any group of words. For example, adpositional phrases (e.g., "in response to receiving the message" and "upon detection of the person") and conjunctional phrases can be identified and linked to a corresponding phrase (e.g., "in response to receiving the message, sending a response" and "upon detection of the person, activating an alarm") that can be converted into a complete sentence.

According to some examples, method 400 includes determining (e.g., by the processor 805) a type of the at least one phrase. In some aspects the type of phrase includes at least one of a functional phrase and a descriptive phrase at block 410. As noted above, a functional phrase identifies a function that is performed, and the descriptive phrase may describe a configuration such as an object being connected to another object, a device integral to another object, and the like.

When the root token corresponds to the noun, the type of the at least one phrase may correspond to the descriptive phrase and, when the root token corresponds to the verb, the type of the at least one phrase may correspond to the functional phrase. However, the possibility of being accurate is insufficient and using a root verb approach will yield incorrect detection because each phrase is different, each client has different preferences, and each attorney responsible for the claim has different preferences. For example, some claims may lead with what appears to be a gerund verb that may be incorrectly identified as a root verb but is incorrect based on the language style. For example, an adpositional phrase can include a gerund verb, but the root of the language can be a noun (e.g., "after receiving the message, the processor processes the message"). Further detail of determining a type of the at least one phrase is further discussed below with reference to FIG. 5. Examples of different phrases processed according to the instant disclosure are illustrated in FIGS. 6A to 6E.

According to some examples, method 400 includes, if the claim is independent, determining a statutory category of the claim at block 412. In some examples, determining a statutory category of the claim can be based on types of phrases. For example, if a first phrase of a claim recitation is a descriptive phrase, the statutory category is an apparatus (or system) claim. If the first phrase of a claim recitation is a functional phrase (e.g., functional), the statutory category is a method claim. In some aspects, in the event a claim is determined to be an apparatus or system (e.g., based on the first phrase or based on a statutory category of a parent claim that a dependent claim depends from), block 412 can include generating a method claim based on the phrases in the claim. In some aspects, the generation of the method claim can occur after various user inputs for creating the patent application.

In further aspects of block 412, method 400 may include determining a statutory category of the claim based on a first noun in the claim. The statutory category may comprise a method claim based on the first noun including a keyword and the statutory category comprises an apparatus based on the first noun not including the keyword. For example, if the first noun in the claim is determined to be similar to a method, the claim is determined to be a method claim.

Method 400 may further include receiving input to modify a phrase of the claim at block 414. In some aspects, the descriptive phrase can be incorrect because a word can have multiple meanings and the phrase may reasonably correspond to both a descriptive and a functional language. Accordingly, a user interface may be implemented that allows a user to remove phrases and create new phrases, as described above with reference to FIG. 3.

In one example of block 414, method 400 can receive an input to delete an incorrectly identified phrase. For example, a user can select a delete option 610 illustrated in FIG. 6A to remove the identified phrase. After removing the identified phrase, the user may create text for a revised phrase based on the user interface. For example, the user can use a cursor and select text in the claim (which limits the text the user can create), or the user can insert text into a user interface for creating entirely new phrases that do not exist in the claims. In response to the new text, the user can submit a request to analyze the text. In some aspects, the request can specify a type of phrase to enforce a particular type of analysis of the claim language. In some aspects, important aspects of the phrase can be omitted from this text, and the user interface can be configured to send a portion of the claim to allow the server to understand the context of the phrase and correctly generate a sentence based on the modified phrase. For example, the phrase can be functional but can be linked to a structure. Accordingly, if the user requests analysis, the user interface can ensure that the appropriate information is sent with the new phrase to allow the processing to correctly identify structures relevant to generating the sentence. For example, if the phrase is "configured to store information," the appropriate context of the phrase is important because a subject cannot be extracted from that phrase itself.

According to some examples, method 400 includes creating text for the at least one phrase to be used in a complete sentence based on the type of the at least one phrase at block 416. For example, the processor 805 illustrated in FIG. 8 may create text for the at least one phrase to be used in a complete sentence based on the type of the at least one phrase.

FIG. 5 illustrates an example method 500 for determining a type of a phrase that is extracted from a claim irrespective of the statutory basis for that claim. For example, the method 500 may be executed in part at block 412 above. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

At block 505, method 500 first determines if the phrase ends with a transitional phrase (e.g., comprising, includes, consists of, integral to, etc.). If the phrase ends with a transitional phrase, method 500 determines that the phrase is a linking phrase that links a content to a phrase that immediately follows the linking phrase at block 510. The linking phrase can also provide a context for phrases that follow the linking phrase (e.g., "a feedback circuit comprising:"). In other examples, the linking phrase can include the content based on the noun of that linking phrase.

If the phrase does not end with a transitional phrase at block 505, method 500 determines whether a root token of the phrase is a noun or a verb at block 515. Method 500 then determines if the root token is a verb and if the phrase includes an object of a verb at block 520. If the root token is not a verb and the phrase does not include an object, method 500 determines that the phrase is a descriptive phrase at block 525.

If the phrase does not include an object of a verb, the method identifies the first word in the tokens that is either a noun or a verb at block 530. In some aspects, the first noun or verb is used to assist in phrase extraction and sentence construction. At block 535, the method determines whether the phrase includes an open clausal phrase (e.g., "a processor configured to", etc.). If the phrase includes an open clausal phrase, method 500 determines that the phrase is a functional phrase and extracts the phrase based on the first noun or verb at block 540. In some aspects, if the phrase includes an adjectival clause that is a past participle verb (e.g., the "connected" in "a processor connected to a device" is a past participle verb that is an adjectival modifier of the noun, the processor), the method 500 can identify the phrase as a descriptive phrase.

If the phrase does not include an open clausal phrase, method 500 determines if the first verb of the phrase is a gerund verb at block 545. If the first verb is a gerund, method 500 determines that the phrase is a functional phrase and extracts the phrase, which can include an adpositional phrase before the phrase, at block 550. At block 555, method 500 can determine the type of phrase based on the root token being a verb or a noun. In some aspects, method 500 can further include additional steps, such as identifying whether the phrase includes a transitional phrase and a subject of that transitional phrase. Additional steps to process the tokens and identify various differences in the claims are contemplated to further improve the phrase type detection.

Method 500 can disambiguate descriptive phrases and functional phrases with high accuracy and examples results of method 500 are described below with reference to FIG. 6A to 6E.

FIGS. 6A to 6E are various example claims that are analyzed based on the disclosed methods to illustrate identification of descriptive phrases, functional phrases, and linking phrases, in accordance with some examples. In each illustration, a region including square corners (e.g., reference numeral 605) indicates a descriptive phrase, and a region including rounded corners (e.g., reference numeral 615) indicates a functional phrase. A region including a dashed border illustrates a linking phrase.

FIG. 6A illustrates an example of a user interface that displays a result of an analysis of a filter circuit recitation from an apparatus claim, in accordance with some examples. The filter circuit provides a good example because it includes both structure and function within a single region, which is extracted based on linebreaks or different paragraph elements in an OpenXML document (e.g., <w:p> elements). The first phrase 605 is descriptive because it describes an electrical configuration of the first circuit. The first phrase also includes a delete option 610 to delete the phrase and allow a user to select and identify specific phrase types. A second phrase 615 is a functional phrase because it describes a function of the filter circuit (attenuating a frequency component). A third phrase 620 is based on a wherein phrase and is determined to be a descriptive phrase, but in some cases could be deemed to be a function. However, the third phrase 620 is descriptive of the base or gate voltage and does not identify a function of the filter circuit. The third phrase 620 also illustrates an example of subject and context. In particular, the subject of the sentence is the filter circuit. However, the subject of the third phrase is the base voltage or the gate voltage. In this case, the subject of the phrase can be mapped to the prior phrases and the sentence for the third phrase 620 can be generated based on the subject of the first phrase. In this case, the third phrase can be mapped to a transitional phrase, which is illustrated in the XML identified in Table 1 above.

FIG. 6B illustrates an example of a user interface that displays a result of an analysis of an independent method claim, in accordance with some examples. In particular, FIG. 6B illustrates the analysis of claim 1 of the instant application and each of the recitations, except phrase 625, are functional phrases. The phrase 625 is descriptive and further defines the type of phrase, and no keyword or trigger language (e.g., wherein, whereby) indicates that the phrase 625 is descriptive.

FIG. 6C illustrates an example of a user interface that displays a result of an analysis of a dependent apparatus claim, in accordance with some examples. The dependent apparatus claim in FIG. 6C includes a linking phrase 630 that is deemed immaterial, a descriptive phrase 635, and a functional phrase 640. In this example, the functional phrase does not include a subject, and the method 500 is capable of identification of the functional phrase without any subject. In this case, the context of the functional phrase can be used to identify the subject, which can be extracted from phrase 635 to form a complete sentence.

FIG. 6D illustrates an example of a user interface that displays a result of an analysis of a dependent apparatus claim without any function, in accordance with some examples. In some examples, the phrase 645 may be incorrectly detected because the object of the verb (comprises) is present. Accordingly, a user can delete the phrase 645 to correct this issue.

FIG. 6E illustrates an example of a user interface that displays a result of an analysis of a dependent apparatus claim with a complex series of conjunctions, in accordance with some examples. In particular, this example illustrates that conjunctions can The first phrase 650 can be used to form a sentence based on the context, which can be identified in the preamble of the claim, and the second phrase 655 can be reconfigured into a complete sentence, despite the complexity of the language.

FIG. 7 illustrates an example claim and a method of identifying subject-context relationships of a claim irrespective of statutory basis, in accordance with some examples. In particular, the context can be treated as a stack (e.g., a last in first out (LIFO) buffer). For example, when processing the claim 700, each line is broken into a different region for processing phrases of each region. The first line 702 includes a subject of amplifier transistor, and the subject is pushed onto a stack, which would have contents of ["amplifier transistor"]. When the second line 704 is analyzed, the formatting of the second line 704 is the same as the formatting of the first line 702, and the stack is popped because the subject of line 702 is not pertinent. The subject of the second line is analyzed and is pushed onto the stack.

This process continues until the processing reaches line 712, which has different formatting than line 710. At line 712, the stack will have contents of ["feedback circuit"] and the subject of line 714 would be pushed onto the stack to yield ["feedback circuit", "control path"]. At line 714, the formatting is the same as the previous line, so the "control path" is popped from the stack and the new subject is pushed onto the stack to yield ["feedback circuit", "replica transistor"].

The subject and context of the different phrases can be identified based on the subject of the phrase, if a subject exists, or from the last item in the stack, if a subject does not exist. A context is identified from the stack. This process allows the different phrases to be analyzed in context and the sentences can be generated based on subject/context, the type of phrase, and details about the phrase. For example, the phrase 640 in FIG. 6C does not includes a subject and implementing a method illustrated in FIG. 7 would provide the subject of the phrase 645 in the stack.

While much of the above description is focused on receiving claim segments as an input into the natural language processing engine, the disclosed natural language processing techniques can be used to disambiguate text and perform related functions. For example, the disambiguation of functional or descriptive phrase can be used in connection with searching, summarizing, sentiment analysis, and other related functions.

As described above the present technology can receive any collection of statements having a basic relationship between the statements and can extract parts of speech from these statements and provide an initial organization for the statements. Thereafter the present technology can receive further inputs to rearrange and modify and add to the statements and ultimately provide an initial draft of a document. In this way the present technology provides advantages over existing technologies through improvements in the machine-user interface improvements and inputs to natural language processing server improvements in terms of complexity of initial inputs and subsequent inputs which all can result in a better initial draft provided by the natural language processing server and available from existing technologies.

The disclosed system can be applied to any type of standardized document that has a structure that may benefit from visually organizing concepts to form complex relationships from input text. In some examples, the disclosed processes can be used to identify relevant phrases and terms in a contract or an agreement based on text input. In other examples, the disclosed system can be used a new drug application at the U.S. Food and Drug Administration (FDA), a change request for a manufacturing process, a non-disclosure agreement, or a technical paper In other examples, the disclosed system can be used in a new drug application at the FDA, a change request for a manufacturing process, or a proposal. As an example, the disclosed system may implement a named entity recognition (NER) module to identify chemical compounds and use the identified chemical compounds to create a user interface that would allow the user to control components to create a description for the new drug application.

Additional concepts can be incorporated to further benefit the disclosed system. For instance, an NER module can be trained based on patent claims to identify common words and identify points to segment claims and identify logical breaks in claims. An NER module may also be used to analyze language and generate a sequence diagram illustrating communication between different devices such as FIG. 3 of the instant disclosure. The user would be provided an interface similar to the disclosure above to allow correction of the communication sequence and then further create a description of the communication sequence.

However, the disclosure can also apply to content that relates to content reuse through searching using different techniques. For instance, the disclosure can be applied to a legal document (e.g., a contract, an agreement, etc.) and/or a formal document (e.g., a petition, a plan, a proposal, a request for proposal (RFP), change request, invoice, etc.) comporting with at least one procedure, statute, or requirement.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

FIG. 8 illustrates an example computer system 800 for executing client or server operations, in accordance with some examples. For example, the example computer system 800 may execute a client application, a server-side application for performing the instant disclosure, or an NLP engine.

The example computer system 800 includes a processor 805, a memory 810, a graphical device 815, a network device 820, interface 825, and a storage device 830 that communicate and operate via a connection 835. The connection 835 can be a physical connection via a bus, or a direct connection into processor 805, such as in a chipset architecture. The connection 835 can also be a virtual connection, networked connection, or logical connection.

The processor 805 reads machine instructions (e.g., reduced instruction set (RISC), complex instruction set (CISC), etc.) that are loaded into the memory 810 via a bootstrapping process and executes an operating system for executing applications within frameworks provided by the operating system. That is, the processor 805 can include any general-purpose processor and a hardware service or software service, which are stored in memory 810, and configured to control processor 805 as well as a special-purpose processor where software instructions are incorporated into the actual processor design. The processor 805 may essentially be a completely self-contained computing system, containing multiple cores or processors, a bus, memory controller, cache, etc. A multi-core processor may be symmetric or asymmetric.

For example, the processor 805 may execute an application that executes an application provided by a graphical framework such as Winform, WPF, Windows User Interface (WinUI), or a cross-platform user interface such as Xamarin or QT. In other examples, the processor 805 may execute an application that is written for a sandbox environment such as a web browser.

The processor 805 controls the memory 810 to store instructions, user data, operating system content, and other content that cannot be stored within the processor 805 internally (e.g., within the various caches). The processor 805 may also control a graphical device 815 (e.g., a graphical processor) that outputs graphical content to a display 840. In some examples, the graphical device 815 may be integrated within the processor 805. In yet another example, the display 840 may be integral with the computer system 800 (e.g., a laptop, a tablet, a phone, etc.). In some examples, the graphical device 815 may be integral with the processor 805 and form an accelerated processing unit (APU).

The graphical device 815 may be optimized to perform floating point operations such as graphical computations, and may be configured to execute other operations in place of the processor 805. For example, controlled by instructions to perform mathematical operations optimized for floating point math. For example, the processor 805 may allocate instructions to the graphical device 815 for operations that are optimized for the graphical device 815. For instance, the graphical device 815 may execute operations related to artificial intelligence (AI), NLP, and vector math. The results may be returned to the processor 805. In another example, the application executing in the processor 805 may provide instructions to cause the processor 805 to request the graphical device 815 to perform the operations. In other examples, the graphical device 815 may return the processing results to another computer system (i.e., distributed computing).

The processor 805 may also control a network device 820 for transmits and receives data using a plurality of wireless channels 845 and at least one communication standard (e.g., Wi-Fi (i.e., 802.11ax, 802.11e, etc.), Bluetooth®, various standards provided by the 3rd Generation Partnership Project (e.g., 3G, 4G, 5G), or a satellite communication network (e.g., Starlink®). The network device 820 may wirelessly connect to a network 850 to connect to servers 855 or other service providers. The network device 820 may also be connected to the network 850 via a physical (i.e., circuit) connection. The network device 820 may also directly connect to local electronic device 860 using a point-to-point (P2P) or a short-range radio connection.

The processor 805 may also control an interface 825 that connects with an external device 870 for bidirectional or unidirectional communication. The interface 825 is any suitable interface that forms a circuit connection and can be implemented by any suitable interface (e.g., universal serial bus (USB), Thunderbolt, and so forth). The external device 865 can receive data from interface 825 to process the data or perform functions for different applications executing in the processor 805. For example, the external device 865 may be another display device, a musical instrument, a computer interface device (e.g., a keyboard, a mouse, etc.), an audio device (e.g., an analog-to-digital converter (ADC), a digital-to-analog converter (DAC)), a storage device for storing content, an authentication device, an external network interface (e.g., a 5G hotspot), a printer, and so forth.

The storage device 830 can be a non-volatile memory device and can be a hard disk or other types of computer-readable media which can store data that are accessible by a computer, such as flash memory, solid state memory devices, an electro-mechanical data storage such as a hard disk drive (HDD), optical storage medium such as digital versatile disks, cartridges, random access memories (RAMs), read only memory (ROM), and/or some combination of these devices. In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

The storage device 830 can include software services, servers, services, etc., that, when the code that defines such software is executed by the processor 805, it causes the system to perform a function. In some embodiments, a hardware service that performs a particular function can include the software component stored in a computer-readable medium in connection with the necessary hardware components, such as processor 805, connection 835, external device 870, etc., to carry out the function.

FIG. 9 shows an example of computing system 900, which can be for example any computing device making up any network node such as the client 302, webserver 304, or NLP server 306, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments computing system 900 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example computing system 900 includes at least one processing unit (CPU or processor) 910 and connection 905 that couples various system components including system memory 915, such as ROM 920 and RAM 925 to processor 910. Computing system 900 can include a cache of high-speed memory 912 connected directly with, in close proximity to, or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, RAMs, ROMs, and/or some combination of these devices.

The storage device 930 can include software services, servers, services, etc., that, when the code that defines such software is executed by the processor 910, causes the system to perform a function. In some embodiments, a hardware service that performs a particular function can include the software component stored in a computer-readable medium in connection with the necessary hardware components, such as processor 910, connection 905, output device 935, etc., to carry out the function.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

In some examples, the system can be implemented in a virtualized and/or container system. For example, the system can be implemented in a single or multiple Docker containers on a Docker Host. As an example, various aspects of the system can be separated into different containers to isolate functions (e.g., application, storage, etc.) across a single Docker host or multiple Docker hosts. In another example, the system can be implemented in a scalable container system (e.g., a Kubernetes cluster) that automatically provisions containers, networking, load balancing, security, and scaling of the system.

Illustrative examples of the disclosure include:

Aspect 1. A method comprising: receiving a claim to be included in a patent application; separating the claim into a plurality of regions based on breakpoint; analyzing each region using a natural language processor; identifying at least one phrase within each region; determining a type of the at least one phrase, the type of phrasing including one of a functional phrase and an descriptive phrase; and creating text for the at least one phrase to be used in a complete sentence based on the type of the at least one phrase.

Aspect 2. The method of Aspect 1, further comprising: identifying tokens in results of the natural language processor that are immaterial to creating sentences from the claim.

Aspect 3. The method of any of Aspects 1 to 2, further comprising: identifying whether the at least one phrase includes a subject based on whether a noun corresponding to the subject occurs before a verb, wherein the text to be used in the complete sentence includes the subject of the at least one phrase.

Aspect 4. The method of any of Aspects 1 to 3, further comprising: identifying a leading phrase prior to the at least one phrase having a context that incorporates the at least one phrase, wherein the text to be used in the complete sentence has a subject corresponding to the context.

Aspect 5. The method of any of Aspects 1 to 4, further comprising: determining whether a subject of the complete sentence corresponds to the subject in the at least one phrase or the context of the at least one phrase, wherein, when the subject of the complete sentence corresponds to the context of the at least one phrase, the subject of the complete sentence is a child element that defines the context.

Aspect 6. The method of any of Aspects 1 to 5, further comprising: identifying a second phrase in the region including the at least one phrase; determining a type of the second phrase; and creating text for the second phrase to be used in a second complete sentence based on the type of the second phrase.

Aspect 7. The method of any of Aspects 1 to 6, further comprising: receiving a first input to delete the at least one phrase; receiving a second input to create a third phrase based on a region of selected text, the second input including a type of the third phrase; and creating text for the third phrase to be used in a third complete sentence based on the type of the third phrase.

Aspect 8. The method of any of Aspects 1 to 7, further comprising: determining a statutory category of the claim based on types of phrases.

Aspect 9. The method of any of Aspects 1 to 8, further comprising: when the statutory category of the claim corresponds to a system or device, generating a method claim based on phrases in the claim.

Aspect 10. The method of any of Aspects 1 to 9, further comprising: determining a statutory category of the claim based on a first noun in the claim, wherein the statutory category comprise a method claim based on the first noun including a keyword and the statutory category comprises an apparatus based on the first noun not including the keyword.

Aspect 11. The method of any of Aspects 1 to 10, wherein identifying the at least one phrase comprises: separating the region into groups of words based on punctuation in the region; separately analyzing each group of words using the natural language processor; and determining whether to merge any group of words based on a group corresponding to one of an adposition phrase and a token corresponding to a conjunction.

Aspect 12. The method of any of Aspects 1 to 11, wherein determining the type of the at least one phrase comprises: determining whether a root token of the at least one phrase corresponds to a noun or a verb.

Aspect 13. The method of any of Aspects 1 to 12, wherein determining the type of the at least one phrase further comprises: when the root token corresponds to the noun, the type of the at least one phrase corresponds to the descriptive phrase.

Aspect 14. The method of any of Aspects 1 to 13, wherein determining the type of the at least one phrase further comprises: when the root token corresponds to the verb, the type of the at least one phrase corresponds to the functional phrase.

Aspect 15. The method of any of Aspects 1 to 14, further comprising: determining whether the at least one phrase includes an object of the verb; and when the at least one phrase does not include the object, determining the type of phrase corresponds to the descriptive phrase.

Aspect 16. The method of any of Aspects 1 to 15, wherein the creating text for the at least one phrase comprises: identifying a first token corresponding to one of a first noun and a first verb in the at least one phrase; analyzing the at least one phrase; and generating the complete sentence based on the analysis of the at least one phrase, the type of the at least one phrase, and whether the first token corresponds to the noun or the verb.

Aspect 17. method of any of Aspects 1 to 16, wherein analyzing the at least one phrase comprises: determining whether the at least one phrase includes an open clausal phrase; and when the at least one phrase includes the open clausal phrase, extracting the open clausal phrase and identifying a subject for the complete sentence.

Aspect 18. The method of any of Aspects 1 to 17, wherein analyzing the at least one phrase comprises: identifying a second token corresponding the first verb in the at least one phrase; determining whether the second token corresponds to a gerund; and when the second token corresponds to the gerund, extracting a verb phrase including the first verb.

Aspect 19. The method of any of Aspects 1 to 18, further comprising: determining whether the at least one phrase ends in a transitional phrase; and when the at least one phrase ends in the transitional phrase, determining that the at least one phrase comprises a linking phrase that further defines a prior phrase based on a phrase immediately following the linking phrase.

Aspect 20. The method of any of Aspects 1 to 19, further comprising: displaying a user interface to edit the claim; in response to an receiving text modifying a first phrase, creating a modified text to be used in a complete sentence based on the type of the at least one phrase; and updating the first phrase to include the modified text.

Aspect 21: A computer system includes a storage (implemented in circuitry) configured to store instructions and a processor. The processor is configured to execute the instructions and cause the processor to: receive a claim to be included in a patent application; separate the claim into a plurality of regions based on breakpoint; analyze each region using a natural language processor; identify at least one phrase within each region; determine a type of the at least one phrase, the type of phrasing including one of a functional phrase and an descriptive phrase; and create text for the at least one phrase to be used in a complete sentence based on the type of the at least one phrase.

Aspect 22: The computer system of Aspect 21, wherein the processor is configured to execute the instructions and cause the processor to: identify tokens in results of the natural language processor that are immaterial to creating sentences from the claim.

Aspect 23: The computer system of any of Aspects 21 to 22, wherein the processor is configured to execute the instructions and cause the processor to: identify whether the at least one phrase includes a subject based on whether a noun corresponding to the subject occurs before a verb, wherein the text to be used in the complete sentence includes the subject of the at least one phrase.

Aspect 24: The computer system of any of Aspects 21 to 23, wherein the processor is configured to execute the instructions and cause the processor to: identify a leading phrase prior to the at least one phrase having a context that incorporates the at least one phrase, wherein the text to be used in the complete sentence has a subject corresponding to the context.

Aspect 25: The computer system of any of Aspects 21 to 24, wherein the processor is configured to determine whether a subject of the complete sentence corresponds to the subject in the at least one phrase or the context of the at least one phrase, and, when the subject of the complete sentence corresponds to the context of the at least one phrase, the subject of the complete sentence is a child element that defines the context.

Aspect 26: The computer system of any of Aspects 21 to 25, wherein the processor is configured to execute the instructions and cause the processor to: identify a second phrase in the region including the at least one phrase; determine a type of the second phrase; and create text for the second phrase to be used in a second complete sentence based on the type of the second phrase.

Aspect 27: The computer system of any of Aspects 21 to 26, wherein the processor is configured to execute the instructions and cause the processor to: receive a first input to delete the at least one phrase; receive a second input to create a third phrase based on a region of selected text, the second input including a type of the third phrase; and create text for the third phrase to be used in a third complete sentence based on the type of the third phrase.

Aspect 28: The computer system of any of Aspects 21 to 27, wherein the processor is configured to execute the instructions and cause the processor to: determine a statutory category of the claim based on types of phrases.

Aspect 29: The computer system of any of Aspects 21 to 28, wherein the processor is configured to execute the instructions and cause the processor to: when the statutory category of the claim corresponds to a system or device, generate a method claim based on phrases in the claim.

Aspect 30: The computer system of any of Aspects 21 to 29, wherein the processor is configured to execute the instructions and cause the processor to: determine a statutory category of the claim based on a first noun in the claim, wherein the statutory category comprise a method claim based on the first noun including a keyword and the statutory category comprises an apparatus based on the first noun not including the keyword.

Aspect 31: The computer system of any of Aspects 21 to 30, wherein the processor is configured to execute the instructions and cause the processor to: separate the region into groups of words based on punctuation in the region; and determine whether to merge any group of words based on a group corresponding to one of an adposition phrase and a token corresponding to a conjunction.

Aspect 32: The computer system of any of Aspects 21 to 31, wherein the processor is configured to execute the instructions and cause the processor to: determine whether a root token of the at least one phrase corresponds to a noun or a verb.

Aspect 33: The computer system of any of Aspects 21 to 32, wherein when the root token corresponds to the noun, the type of the at least one phrase corresponds to the descriptive phrase.

Aspect 34: The computer system of any of Aspects 21 to 33, wherein when the root token corresponds to the verb, the type of the at least one phrase corresponds to the functional phrase.

Aspect 35: The computer system of any of Aspects 21 to 34, wherein the processor is configured to execute the instructions and cause the processor to: determine whether the at least one phrase includes an object of the verb; and when the at least one phrase does not include the object, determine the type of phrase corresponds to the descriptive phrase.

Aspect 36: The computer system of any of Aspects 21 to 35, wherein the processor is configured to execute the instructions and cause the processor to: identify a first token corresponding to one of a first noun and a first verb in the at least one phrase; analyze the at least one phrase; and generate the complete sentence based on the analysis of the at least one phrase, the type of the at least one phrase, and whether the first token corresponds to the noun or the verb.

Aspect 37: The computer system of any of Aspects 21 to 36, wherein the processor is configured to execute the instructions and cause the processor to: determine whether the at least one phrase includes an open clausal phrase; and, when the at least one phrase includes the open clausal phrase, extract the open clausal phrase and identifying a subject for the complete sentence.

Aspect 38: The computer system of any of Aspects 21 to 37, wherein the processor is configured to execute the instructions and cause the processor to: identify a second token corresponding the first verb in the at least one phrase; determine whether the second token corresponds to a gerund; and, when the second token corresponds to the gerund, extract a verb phrase including the first verb.

Aspect 39: The computer system of any of Aspects 21 to 38, wherein the processor is configured to: determine whether the at least one phrase ends in a transitional phrase; and, when the at least one phrase ends in the transitional phrase, determine that the at least one phrase comprises a linking phrase that further defines a prior phrase based on a phrase immediately following the linking phrase.

Aspect 40: The computer system of any of Aspects 21 to 39, wherein the processor is configured to execute the instructions and cause the processor to: display a user interface to edit the claim; in response to an receiving text modifying a first phrase, create a modified text to be used in a complete sentence based on the type of the at least one phrase; and update the first phrase to include the modified text.

Aspect 41: A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: receive a claim to be included in a patent application; separate the claim into a plurality of regions based on breakpoint; analyze each region using a natural language processor; identify at least one phrase within each region; determine a type of the at least one phrase, the type of phrasing including one of a functional phrase and an descriptive phrase; and create text for the at least one phrase to be used in a complete sentence based on the type of the at least one phrase.

Aspect 42: The computer readable medium of Aspect 41, wherein the processor is configured to execute the computer readable medium and cause the processor to: identify tokens in results of the natural language processor that are immaterial to creating sentences from the claim.

Aspect 43: The computer readable medium of any of Aspects 41 to 42, wherein the processor is configured to execute the computer readable medium and cause the processor to: identify whether the at least one phrase includes a subject based on whether a noun corresponding to the subject occurs before a verb, wherein the text to be used in the complete sentence includes the subject of the at least one phrase.

Aspect 44: The computer readable medium of any of Aspects 41 to 43, wherein the processor is configured to execute the computer readable medium and cause the processor to: identify a leading phrase prior to the at least one phrase having a context that incorporates the at least one phrase, wherein the text to be used in the complete sentence has a subject corresponding to the context.

Aspect 45: The computer readable medium of any of Aspects 41 to 44, wherein the processor is configured to execute the computer readable medium and cause the processor to: determine whether a subject of the complete sentence corresponds to the subject in the at least one phrase or the context of the at least one phrase and, when the subject of the complete sentence corresponds to the context of the at least one phrase, the subject of the complete sentence is a child element that defines the context.

Aspect 46: The computer readable medium of any of Aspects 41 to 45, wherein the processor is configured to execute the computer readable medium and cause the processor to: identify a second phrase in the region including the at least one phrase; determine a type of the second phrase; and create text for the second phrase to be used in a second complete sentence based on the type of the second phrase.

Aspect 47: The computer readable medium of any of Aspects 41 to 46, wherein the processor is configured to execute the computer readable medium and cause the processor to: receive a first input to delete the at least one phrase; receive a second input to create a third phrase based on a region of selected text, the second input including a type of the third phrase; and create text for the third phrase to be used in a third complete sentence based on the type of the third phrase.

Aspect 48: The computer readable medium of any of Aspects 41 to 47, wherein the processor is configured to execute the computer readable medium and cause the processor to: determine a statutory category of the claim based on types of phrases.

Aspect 49: The computer readable medium of any of Aspects 41 to 48, wherein the processor is configured to execute the computer readable medium and cause the processor to: when the statutory category of the claim corresponds to a system or device, generate a method claim based on phrases in the claim.

Aspect 50: The computer readable medium of any of Aspects 41 to 49, wherein the processor is configured to execute the computer readable medium and cause the processor to: determine a statutory category of the claim based on a first noun in the claim, wherein the statutory category comprise a method claim based on the first noun including a keyword and the statutory category comprises an apparatus based on the first noun not including the keyword.

Aspect 51: The computer readable medium of any of Aspects 41 to 50, wherein the processor is configured to execute the computer readable medium and cause the processor to: separate the region into groups of words based on punctuation in the region; and determine whether to merge any group of words based on a group corresponding to one of an adposition phrase and a token corresponding to a conjunction.

Aspect 52: The computer readable medium of any of Aspects 41 to 51, wherein the processor is configured to execute the computer readable medium and cause the processor to: determine whether a root token of the at least one phrase corresponds to a noun or a verb.

Aspect 53: The computer readable medium of any of Aspects 41 to 52, wherein when the root token corresponds to the noun, the type of the at least one phrase corresponds to the descriptive phrase.

Aspect 54: The computer readable medium of any of Aspects 41 to 53, wherein when the root token corresponds to the verb, the type of the at least one phrase corresponds to the functional phrase.

Aspect 55: The computer readable medium of any of Aspects 41 to 54, wherein the processor is configured to execute the computer readable medium and cause the processor to: determine whether the at least one phrase includes an object of the verb; and, when the at least one phrase does not include the object, determine the type of phrase corresponds to the descriptive phrase.

Aspect 56: The computer readable medium of any of Aspects 41 to 55, wherein the processor is configured to execute the computer readable medium and cause the processor to: identify a first token corresponding to one of a first noun and a first verb in the at least one phrase; analyze the at least one phrase; and generate the complete sentence based on the analysis of the at least one phrase, the type of the at least one phrase, and whether the first token corresponds to the noun or the verb.

Aspect 57: The computer readable medium of any of Aspects 41 to 56, wherein the processor is configured to execute the computer readable medium and cause the processor to: determine whether the at least one phrase includes an open clausal phrase; and when the at least one phrase includes the open clausal phrase, extract the open clausal phrase and identifying a subject for the complete sentence.

Aspect 58: The computer readable medium of any of Aspects 41 to 57, wherein the processor is configured to execute the computer readable medium and cause the processor to: identify a second token corresponding the first verb in the at least one phrase; determining whether the second token corresponds to a gerund; and when the second token corresponds to the gerund, extract a verb phrase including the first verb.

Aspect 59: The computer readable medium of any of Aspects 41 to 58, wherein the processor is configured to execute the computer readable medium and cause the processor to: determine whether the at least one phrase ends in a transitional phrase; and, when the at least one phrase ends in the transitional phrase, determine that the at least one phrase comprises a linking phrase that further defines a prior phrase based on a phrase immediately following the linking phrase.

Aspect 60: The computer readable medium of any of Aspects 41 to 59, wherein the processor is configured to execute the computer readable medium and cause the processor to: display a user interface to edit the claim; in response to an receiving text modifying a first phrase, create a modified text to be used in a complete sentence based on the type of the at least one phrase; and update the first phrase to include the modified text.

The invention claimed is:

1. A computer-implemented method comprising:
   displaying, by a processor, a user interface to generate a patent application based on claims;
   receiving, by the processor via the user interface, a claim to be included in the patent application;
   separating, by the processor, the claim into a plurality of regions based on a breakpoint;
   transmitting, by the processor to a natural language processor (NLP) server, the plurality of regions, wherein the NLP server generates a set of NLP tokens, which each NLP token includes a plurality of grammatical relationships;
   receiving, by the processor, the set of NLP tokens associated with the plurality of regions;
   identifying, by the processor, at least one phrase within each region, wherein the at least one phrase is associated with a subset of NLP tokens of the set of NLP tokens;
   determining, by the processor, a root token of the subset of NLP tokens;
   determining, by the processor, a type of the at least one phrase based on the root token, the type of phrase including one of a functional phrase and a descriptive phrase, wherein the type of the at least one phrase is based on the root token of the at least one phrase, and wherein the descriptive phrase describes an object and the functional phrase describes a function of the object;
   in response to receiving text modifying a first phrase via the user interface, creating, by the processor, a modified text to be used in a complete sentence based on the type of the at least one phrase from the apparatus claim; and
   updating, by the processor, the first phrase to include the modified text;
   creating, by the processor, the patent application including the complete sentence generated based on the type of the at least one phrase.

2. The computer-implemented method of claim 1, further comprising:
   identifying, by the processor, NLP tokens in results of the natural language processor server that are immaterial to creating sentences from the claim.

3. The computer-implemented method of claim 1, further comprising:
   identifying, by the processor, whether the at least one phrase includes a subject based on whether a noun corresponding to the subject occurs before a verb, wherein the text to be used in the complete sentence includes the subject of the at least one phrase.

4. The computer-implemented method of claim 3, further comprising:
   identifying, by the processor, a leading phrase prior to the at least one phrase having a context that incorporates the at least one phrase, wherein the text to be used in the complete sentence has a subject corresponding to the context.

5. The computer-implemented method of claim 4, further comprising:
   determining, by the processor, whether a subject of the complete sentence corresponds to the subject in the at least one phrase or the context of the at least one phrase, wherein, when the subject of the complete sentence corresponds to the context of the at least one phrase, the subject of the complete sentence is a child element that defines the context.

6. The computer-implemented method of claim 3, further comprising:
   identifying, by the processor, a second phrase in a corresponding region including the at least one phrase;
   determining, by the processor, a type of the second phrase; and
   creating, by the processor, text for the second phrase to be used in a second complete sentence based on the type of the second phrase.

7. The computer-implemented method of claim 1, further comprising:
   receiving, by the processor, a first input to delete the at least one phrase;
   receiving, by the processor, a second input to create a third phrase based on a region of selected text, the second input including a type of the third phrase; and
   creating, by the processor, text for the third phrase to be used in a third complete sentence based on the type of the third phrase.

8. The computer-implemented method of claim 1, further comprising:
   determining, by the processor, a statutory category of the claim based on types of phrases.

9. The computer-implemented method of claim 1, further comprising:
   determining, by the processor, a statutory category of the claim based on a first noun in the claim, wherein the statutory category comprise a method claim based on the first noun including a keyword and the statutory category comprises an apparatus based on the first noun not including the keyword.

10. The computer-implemented method of claim 1, wherein identifying the at least one phrase comprises:
    separating, by the processor, a region into groups of words based on punctuation in the region;
    separately analyzing, by the processor, each group of words using the natural language processor server; and
    determining, by the processor, whether to merge any group of words based on a group corresponding to one of an adposition phrase and a token corresponding to a conjunction.

11. The computer-implemented method of claim 1, wherein determining the type of the at least one phrase comprises:
    determining, by the processor, whether the root token of the at least one phrase corresponds to a noun or a verb.

12. The computer-implemented method of claim 11, wherein determining the type of the at least one phrase further comprises:
    when the root token corresponds to the noun, the type of the at least one phrase corresponds to the descriptive phrase.

13. The computer-implemented method of claim 11, wherein determining the type of the at least one phrase further comprises:
    when the root token corresponds to the verb, the type of the at least one phrase corresponds to the functional phrase.

14. The computer-implemented method of claim 13, further comprising:
    determining, by the processor, whether the at least one phrase includes an object of the verb; and
    when the at least one phrase does not include the object, determining, by the processor, the type of phrase corresponds to the descriptive phrase.

15. The computer-implemented method of claim 11, wherein creating the text for the at least one phrase comprises:

identifying, by the processor, a first token corresponding to one of a first noun and a first verb in the at least one phrase;

analyzing, by the processor, the at least one phrase; and generating, by the processor, the complete sentence based on the analysis of the at least one phrase, the type of the at least one phrase, and whether the first token corresponds to the noun or the verb.

16. The computer-implemented method of claim 15, wherein analyzing the at least one phrase comprises:

determining, by the processor, whether the at least one phrase includes an open clausal phrase; and when the at least one phrase includes the open clausal phrase, extracting the open clausal phrase and identifying a subject for the complete sentence.

17. The computer-implemented method of claim 15, wherein analyzing the at least one phrase comprises:

identifying, by the processor, a second token corresponding the first verb in the at least one phrase;

determining, by the processor, whether the second token corresponds to a gerund; and when the second token corresponds to the gerund, extracting a verb phrase including the first verb.

18. The computer-implemented method of claim 1, further comprising:

determining, by the processor, whether the at least one phrase ends in a transitional phrase; and when the at least one phrase ends in the transitional phrase, determining, by the processor, that the at least one phrase comprises a linking phrase that further defines a prior phrase based on a phrase immediately following the linking phrase.

19. The computer-implemented method of claim 8, further comprising:

when the statutory category of the claim corresponds to a system or device, generating, by the processor, a method claim based on phrases in the claim.

* * * * *